(12) United States Patent
Sakurai et al.

(10) Patent No.: US 11,141,869 B2
(45) Date of Patent: Oct. 12, 2021

(54) ROBOT-ARM HARNESS CONNECTION STRUCTURE AND MULTI-JOINED WELDING ROBOT

(71) Applicant: Kobe Steel, Ltd., Kobe (JP)

(72) Inventors: Yasuharu Sakurai, Fujisawa (JP); Yuki Shika, Ibaraki (JP); Motoaki Murakami, Fujisawa (JP); Taichi Igarashi, Fujisawa (JP); Tatsuji Minato, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 40 days.

(21) Appl. No.: 16/476,768

(22) PCT Filed: Jan. 15, 2018

(86) PCT No.: PCT/JP2018/000794
§ 371 (c)(1),
(2) Date: Jul. 9, 2019

(87) PCT Pub. No.: WO2018/142893
PCT Pub. Date: Aug. 9, 2018

(65) Prior Publication Data
US 2019/0329428 A1 Oct. 31, 2019

(30) Foreign Application Priority Data
Feb. 1, 2017 (JP) .............................. JP2017-017110

(51) Int. Cl.
*B25J 19/00* (2006.01)
*H02G 11/00* (2006.01)
(Continued)

(52) U.S. Cl.
CPC ....... *B25J 19/0025* (2013.01); *B25J 15/0019* (2013.01); *B25J 18/00* (2013.01); *H02G 11/00* (2013.01)

(58) Field of Classification Search
CPC ... B25J 19/0025; B25J 19/0029; H02G 11/00; Y10T 74/20311
See application file for complete search history.

(56) References Cited

U.S. PATENT DOCUMENTS 5,606,235 A * 2/1997 Mauletti .................. B25J 9/046
318/625
6,250,174 B1 * 6/2001 Terada ..................... B25J 9/047
414/918
(Continued)

FOREIGN PATENT DOCUMENTS

| JP | 4142304 B2 | 9/2008 |
| JP | 5715198 B2 | 5/2015 |
| JP | 2016-78146 A | 5/2016 |

OTHER PUBLICATIONS

International Search Report dated Mar. 13, 2018 in PCT/JP2018/000794 filed Jan. 15, 2018.
(Continued)

*Primary Examiner* — Bobby Rushing, Jr.
(74) *Attorney, Agent, or Firm* — Oblon, McClelland, Maier & Neustadt, L.L.P.

(57) ABSTRACT

A harness connection structure has a first arm; a second arm which has a base side that is rotatably coupled to the first arm via an arm joint; and a harness that extends from a leading end of the first arm and is guided into an arm interior at the arm joint. The leading end of the first arm has a harness holding part that holds one longitudinal side of the harness. The arm joint has a harness fixing part that fixes the other longitudinal side of the harness inside the arm joint. The harness fixing part is disposed such that the harness is inclined from the longitudinal axis of the second arm toward the leading end of the first arm.

10 Claims, 10 Drawing Sheets

(51) Int. Cl.
*B25J 15/00* (2006.01)
*B25J 18/00* (2006.01)

(56) References Cited

U.S. PATENT DOCUMENTS

| | | | | |
|---|---|---|---|---|
| 8,631,720 | B2* | 1/2014 | Nakagiri | B25J 19/0029 |
| | | | | 74/490.02 |
| 8,863,606 | B2* | 10/2014 | Ichibangase | B25J 19/0025 |
| | | | | 74/490.02 |
| 9,216,479 | B2* | 12/2015 | Takahashi | B25J 18/02 |
| 9,393,703 | B2* | 7/2016 | Kume | B25J 19/0025 |
| 9,597,808 | B2* | 3/2017 | Inoue | B25J 9/101 |
| 9,751,219 | B2* | 9/2017 | Kono | F16L 3/23 |
| 2004/0170363 | A1* | 9/2004 | Angela | G02B 6/4415 |
| | | | | 385/100 |
| 2004/0261562 | A1 | 12/2004 | Haniya et al. | |
| 2006/0104791 | A1* | 5/2006 | Nihei | B25J 19/0025 |
| | | | | 414/737 |
| 2008/0236324 | A1* | 10/2008 | Inoue | B25J 19/0025 |
| | | | | 74/490.02 |
| 2010/0229671 | A1 | 9/2010 | Haniya et al. | |
| 2013/0098190 | A1* | 4/2013 | Pan | B25J 19/0025 |
| | | | | 74/490.02 |
| 2014/0083229 | A1* | 3/2014 | Kume | B25J 19/0025 |
| | | | | 74/490.02 |
| 2014/0290415 | A1* | 10/2014 | Hasuo | B25J 19/0025 |
| | | | | 74/490.02 |
| 2015/0007681 | A1 | 1/2015 | Murakami | |
| 2015/0246449 | A1* | 9/2015 | Sakai | B25J 19/0025 |
| | | | | 74/490.02 |
| 2016/0101528 | A1 | 4/2016 | Inoue et al. | |
| 2016/0221184 | A1* | 8/2016 | Sueyoshi | B25J 9/047 |

OTHER PUBLICATIONS

"Welding a Go-Kart Frame with FANUC's ARC Mate 120iC Arc Welding Robot," FANUC America Corporation, YouTube [online] [video], Apr. 25, 2014 <URL:https://www.youtube.com/watch?v=eFfDX3oyPkQ>.

* cited by examiner

ROBOT-ARM HARNESS CONNECTION STRUCTURE AND MULTI-JOINED WELDING ROBOT

TECHNICAL FIELD

The present invention relates to a robot-arm harness connection structure and a multi-joined welding robot.

BACKGROUND ART

A multi-joined welding robot configured to movably support a welding torch for arc welding by a multi-joined robot has been known (see Patent Documents 1 and 2). This multi-joined welding robot is configured such that the welding torch attached to an arm tip end portion is moved to an optional position on space coordinates in an optional posture by the multi-joined robot including multiple arms coupled through drive shafts. For example, in the case of a six-axis robot, each shaft of a multi-joined robot having at least six degrees of freedom including basic three shafts of a pivoting portion (a first drive shaft), a lower arm (a second drive shaft), and an upper arm (a third drive shaft) is used to move a tip end of the welding torch along a preset welding line.

CITATION LIST

Patent Document

Patent Document 1: Japanese Patent No. 5715198
Patent Document 2: Japanese Patent No. 4142304

SUMMARY OF THE INVENTION

Problem to be Solved by the Invention

The arms of the multi-joined robot are arranged such that a harness bundling various cables such as a power line and a signal line for an arm drive motor extends from one arm to another arm on an arm outer side in the vicinity of a joint portion. A broader movable area of each arm of this multi-joined robot results in a higher degree of freedom in a torch posture, and therefore, a broad movable area not only in a positive rotation direction but also in a negative rotation direction from an original posture of the robot is designed.

However, in the case of driving the arm in the negative rotation direction, the bending radius of the harness connected to the arm might locally reach a smaller bending radius than the allowable bending radius of the harness. Moreover, external force due to torsion is on the harness, and the harness is sandwiched between the arms. For these reasons, an opening through which the harness on the arm outer side is led in the arm is inevitably arranged apart from the arm joint portion coupling the arms. However, in a case where the arm joint portion includes the arm drive motor, no opening can be provided at a spot at which, e.g., a member to be driven by the motor is arranged, and the opening needs to be arranged at a fixing portion not susceptible to motor drive. Thus, for ensuring an opening arrangement space, the arm joint portion is provided to extend to a position apart from a joint center shifted from a motor arrangement position. As a result, the arm joint portion is increased in size, and is increased in weight. This leads to occurrence of vibration in drive. For example, in the case of a six-axis robot, a motor configured to rotatably drive a third drive shaft of an upper arm and a motor configured to rotatably drive a fourth drive shaft for wrist pivoting may be housed in an arm joint portion coupling a lower arm and the upper arm. In this case, an increase in the size of the arm joint portion cannot be avoided for harness drawing.

For these reasons, the present invention is intended to provide a robot-arm harness connection structure configured so that an arm joint portion can be downsized without causing narrowing of a harness bending radius and contact between arms and a multi-joined welding robot.

Solution to the Problem

One aspect of the present invention is a robot-arm harness connection structure including a first arm, a second arm having a base end side rotatably coupled to a tip end portion of the first arm through an arm joint portion, and a harness extending from the tip end portion of the first arm and led in an arm inner side at the arm joint portion of the second arm. The tip end portion of the first arm has a harness holding portion for holding one side of the harness in a longitudinal direction. The arm joint portion has a harness fixing portion for fixing the other side of the harness in the longitudinal direction to the inside of the arm joint portion. The harness fixing portion is configured such that the harness is arranged with the harness being inclined from a longitudinal axis of the second arm to a tip end portion side of the first arm.

According to the robot-arm harness connection structure, the harness is fixed to the arm joint portion with the harness being inclined from the longitudinal axis of the second arm to the tip end side of the first arm. Thus, in the case of driving the first arm and the second arm, curving of the harness with a small curvature radius and great shear force on the harness due to sandwiching of the harness between the arms can be prevented. Moreover, the position at which the harness is led in the arm joint portion can be closer to a joint shaft coupling the arms. Thus, the arm joint portion can be shortened in the longitudinal direction of the second arm, the weight of the arm joint portion can be reduced, and occurrence of vibration in arm drive can be reduced.

The harness is preferably configured such that a curvature generated by inclination by the harness fixing portion is equal to or greater than the allowable bending radius of the harness, and the tip end portion of the first arm is preferably arranged inside a curved inner surface of the harness in a radial direction of an arc line with a curvature radius.

According to the robot-arm harness connection structure, damage due to bending of the harness can be prevented in any posture of the upper arm. Moreover, even if the harness curves to the allowable bending radius, contact between the harness and the tip end portion of the lower arm can be avoided.

The first arm preferably has a first stopper portion. The second arm preferably has a second stopper portion configured to contact the first stopper portion on a leading side in a rotation direction of the second arm and an opening through which the harness extending from the tip end portion of the first arm is led in the arm joint portion. The second stopper portion is preferably arranged on the leading side in the rotation direction with respect to the opening.

According to the robot-arm harness connection structure, when the arm is driven, sandwiching of the harness between the first stopper and the second stopper can be prevented.

A conductive line connected to a motor configured to rotatably drive the second arm is preferably inserted into the harness.

According to the robot-arm harness connection structure, the conductive line, such as a signal line or a power line, connected to the motor can be housed in the harness without curving with a small curvature radius, and can be reliably protected for a long period of time.

One aspect of the present invention is a multi-joined welding robot having the above-described robot-arm harness connection structure.

According to the multi-joined welding robot, the weight of the arm joint portion is reduced, and occurrence of vibration is reduced. Thus, high-accuracy welding can be performed.

The above-described multi-joined welding robot may include a pivoting portion provided pivotably about a first drive shaft along the vertical direction on a base, the first arm having a base end portion coupled to the pivoting portion through a second drive shaft along the horizontal direction, and the second arm coupled to the tip end portion of the first arm and provided rotatably about a third drive shaft parallel with the second drive shaft.

According to the multi-joined welding robot, the size and weight of the arm joint portion of the second arm having the third drive shaft at which inertia force is easily caused can be reduced, and occurrence of vibration on an end effector side due to motor drive can be reduced.

Advantageous Effects of the Invention

According to the present invention, the arm joint portion can be downsized without causing narrowing of the harness bending radius and contact between the arms.

DESCRIPTION OF EMBODIMENTS

Hereinafter, an embodiment of the present invention will be described in detail with reference to the drawings.

Figure 1:
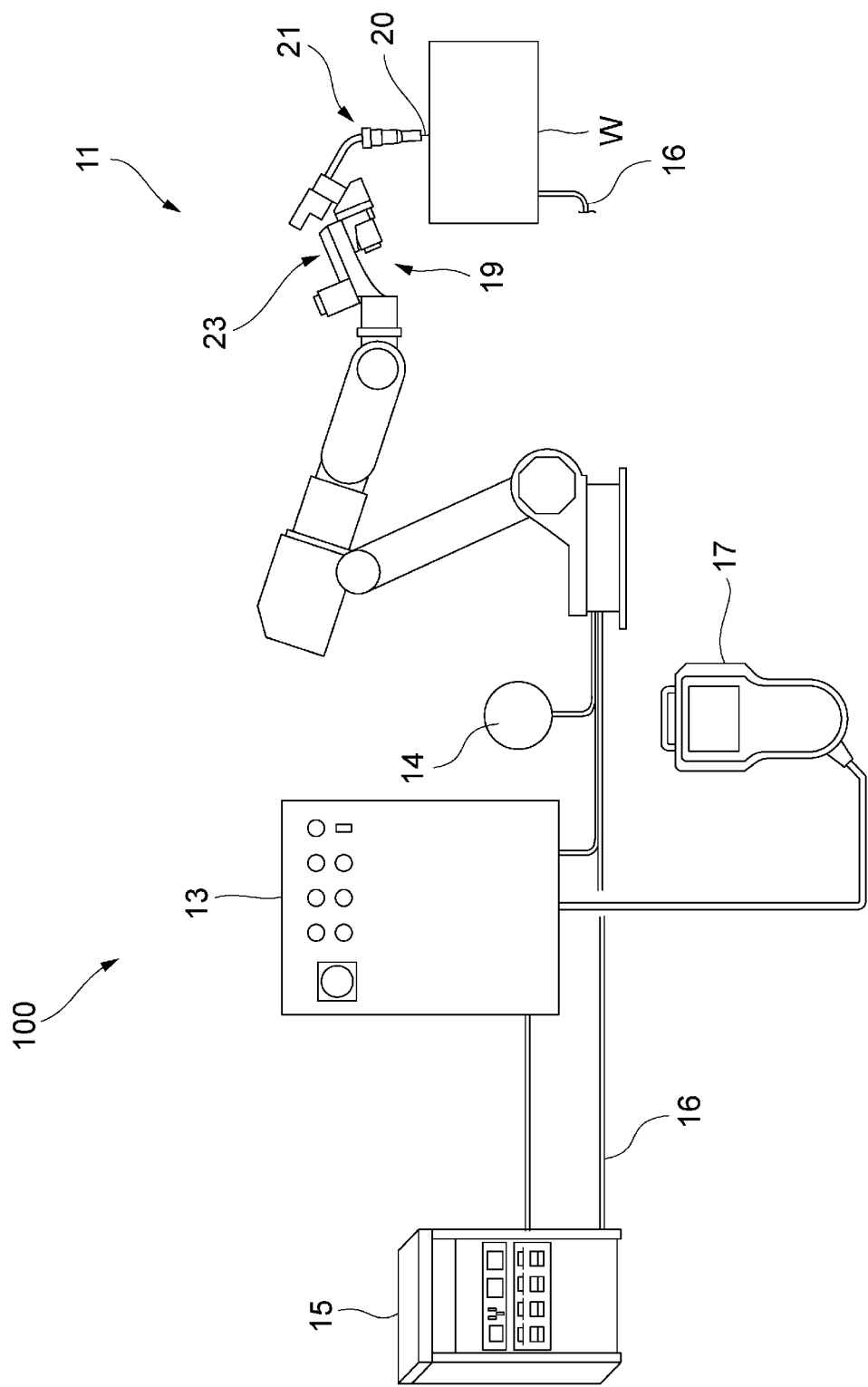
FIG. 1 is a view of an entire configuration of a welding system.

FIG. 1 is a view of an entire configuration of a welding system.

A welding system 100 includes a multi-joined welding robot 11, a control device 13, a welding power supply 15, and a teaching controller 17. An end effector 19 is connected to a tip end shaft of the multi-joined welding robot 11 (hereinafter abbreviated as a "welding robot"). The end effector 19 of the present configuration is a torch support portion 23 having a welding torch 21. In addition to the torch support portion 23, other tools such as a two-axis weaver configured to perform weaving operation of a welding torch and a cutting machine can be employed as the end effector 19.

The control device 13 drives the welding robot 11 based on teaching data input from the teaching controller 17. The control device 13 is a computer device configured such that a CPU reads and executes a program stored in a storage unit such as a ROM, a RAM, or a hard drive to control each unit of the welding system 100.

A welding wire 20 as a consumable electrode, such as a flux cored wire or a solid wire, is reeled out of a wire pack 14 by a not-shown wire feed device, and in this manner, is supplied to a tip end of the welding torch 21. The welding power supply 15 is connected to the welding torch 21 and a work W through a power supply cable 16. According to a command from the control device 13, welding current is supplied to the welding torch 21 through a power cable arranged in the welding robot 11. Moreover, shield gas is supplied to the welding torch 21 to provide protection from entrapment of atmospheric air in welding. Further, cooling water for torch cooling is also supplied to the welding torch 21.

The control device 13 drives the welding robot 11 to move the welding torch 21 to a welding position. Moreover, the control device 13 supplies the welding current from the welding power supply 15 to between a tip end of the welding wire 20 and the work W to generate arc between the welding wire 20 at the tip end of the welding torch 21 in shield gas atmosphere and the work W. While the arc is being generated, the welding robot 11 is driven such that the welding torch 21 moves in a trajectory taught in advance. In this manner, the work W is welded.

Next, a configuration of the welding robot 11 of the welding system 100 will be described in more detail.

Figure 2:
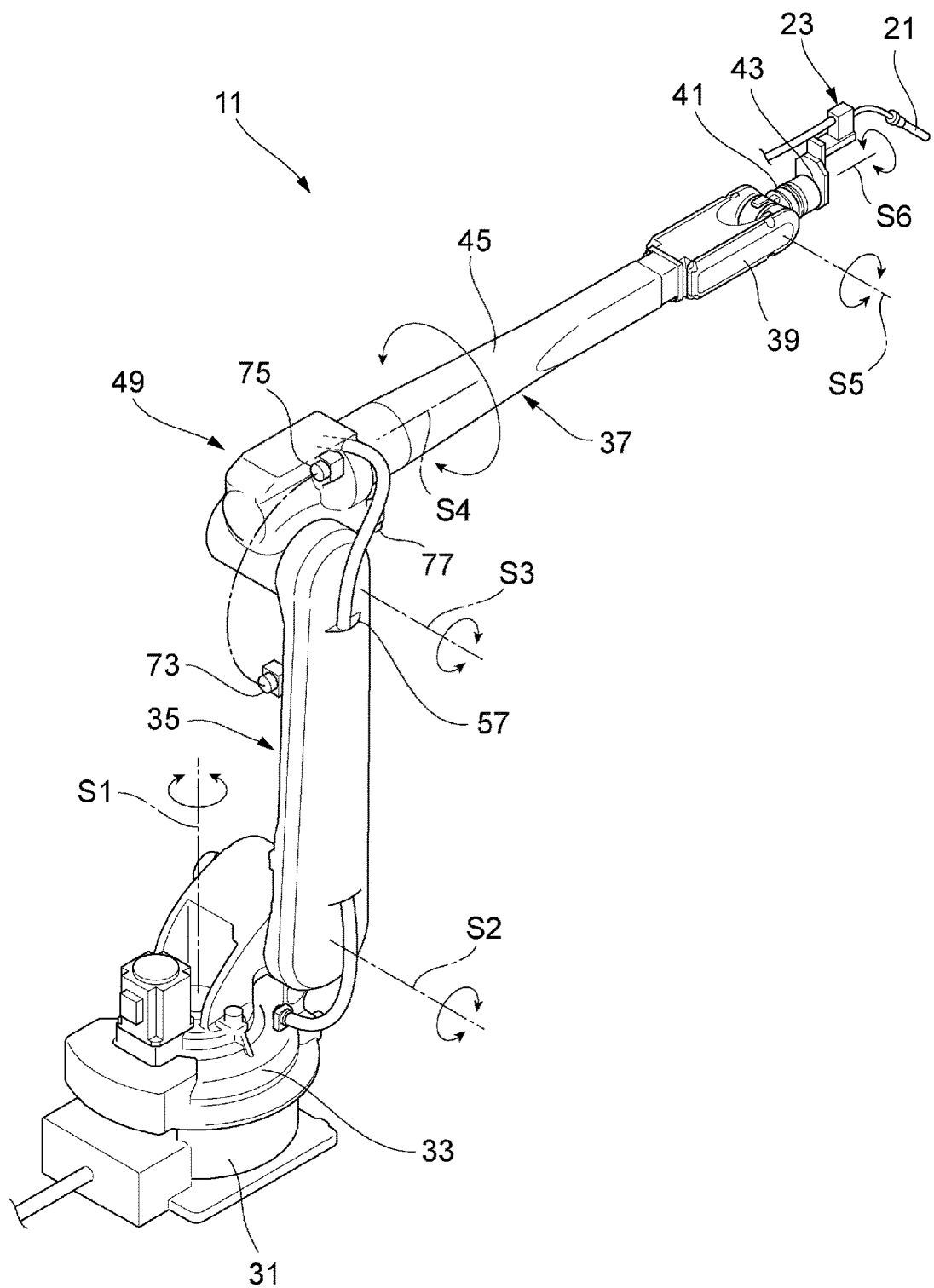
FIG. 2 is a perspective view of an outer appearance of one example of a multi-joined welding robot.
Figure 3:
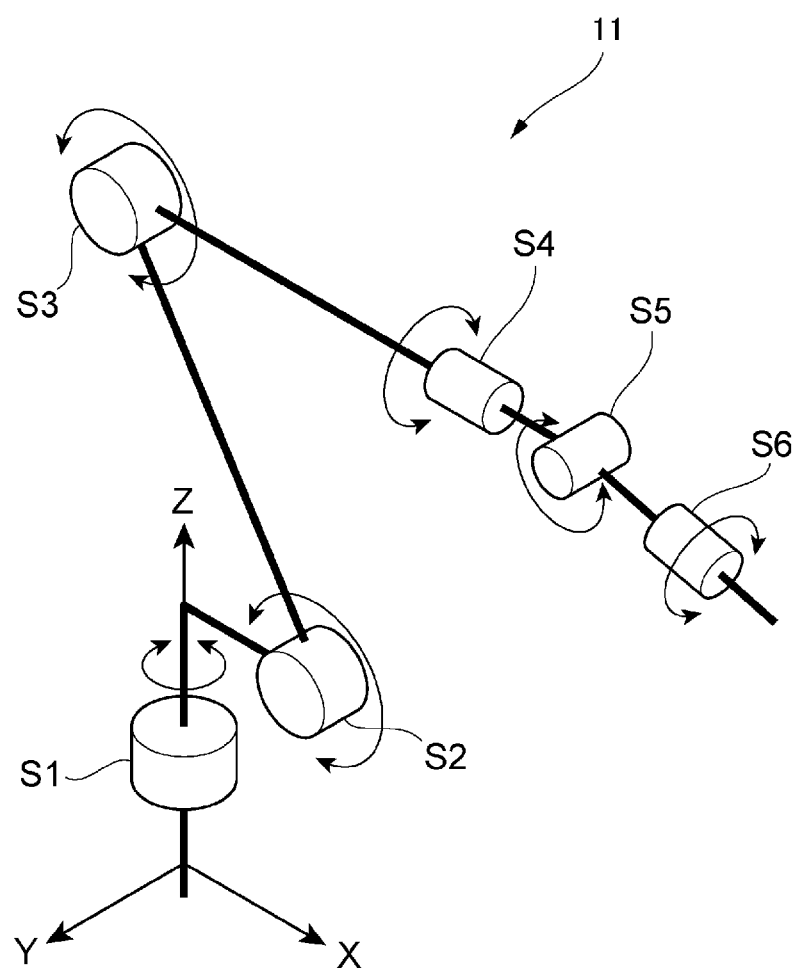
FIG. 3 is a schematic view for describing drive shafts of the multi-joined welding robot illustrated in FIG. 2.

FIG. 2 is a perspective view of an outer appearance of one example of the welding robot, and FIG. 3 is a schematic view for describing a drive shaft of the welding robot illustrated in FIG. 2.

The welding robot 11 described herein is a typical six-axis robot having six drive shafts. In addition to the six-axis robot described herein as an example, the welding robot 11 may be, for example, a seven-axis robot or multiaxial robots having other configurations.

The welding robot 11 includes a base 31, a pivoting portion 33 provided pivotably about a first drive shaft S1 along the vertical direction on the base 31, and a lower arm (a first arm) 35 having one end portion coupled to the pivoting portion 33 through a second drive shaft S2 along the horizontal direction and provided rotatably about the second drive shaft S2. Further, the welding robot 11 includes an upper arm (a second arm) 37 connected to the other end portion of the lower arm 35 through a third drive shaft S3 parallel with the second drive shaft, a wrist pivoting portion 39 provided at the upper arm 37 and provided rotatably about an arm axis by a fourth drive shaft S4, a wrist bending portion 41 connected to the wrist pivoting portion 39 through a fifth drive shaft S5, and a wrist rotation portion 43 connected to a tip end of the wrist bending portion 41 and having a sixth drive shaft S6. The lower arm 35, the upper arm 37, the wrist pivoting portion 39, the wrist bending portion 41, and the wrist rotation portion 43 form a multi-joined arm.

The above-described torch support portion 23 is arranged between the sixth drive shaft S6 of the wrist rotation portion 43 as the shaft of the multi-joined arm on the most tip end side and the welding torch 21.

The first drive shaft S1 to the sixth drive shaft S6 of the welding robot 11 are driven by not-shown drive motors such as servomotors. A drive signal is input from the control device 13 (see FIG. 1) to each of these drive motors such that the rotation angle of each drive shaft is controlled. Accordingly, the welding torch 21 can be positioned in a desired posture in an XYZ space.

Figure 4:
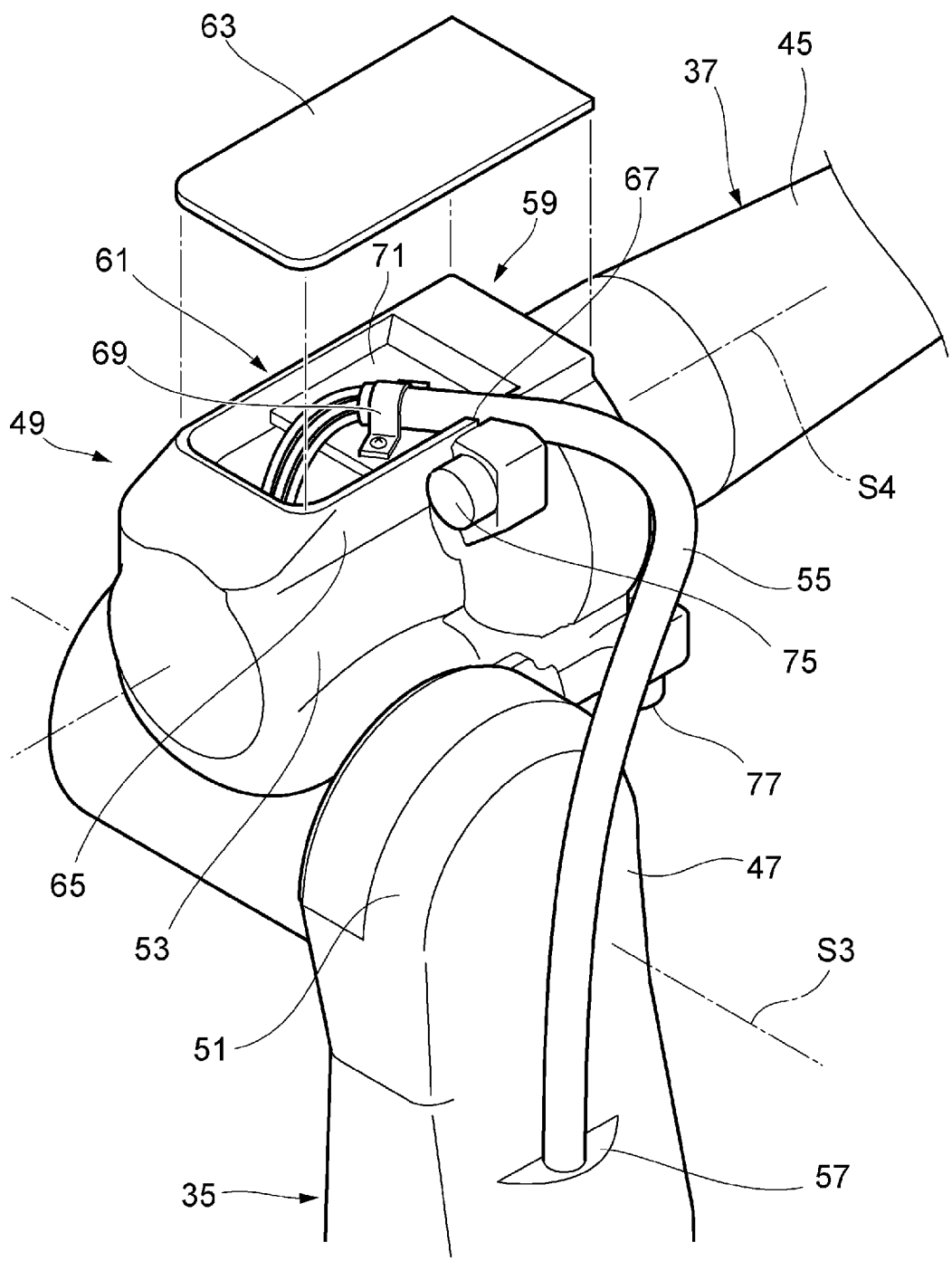
FIG. 4 is an enlarged perspective view of an arm joint portion coupling a lower arm and an upper arm.
Figure 5:
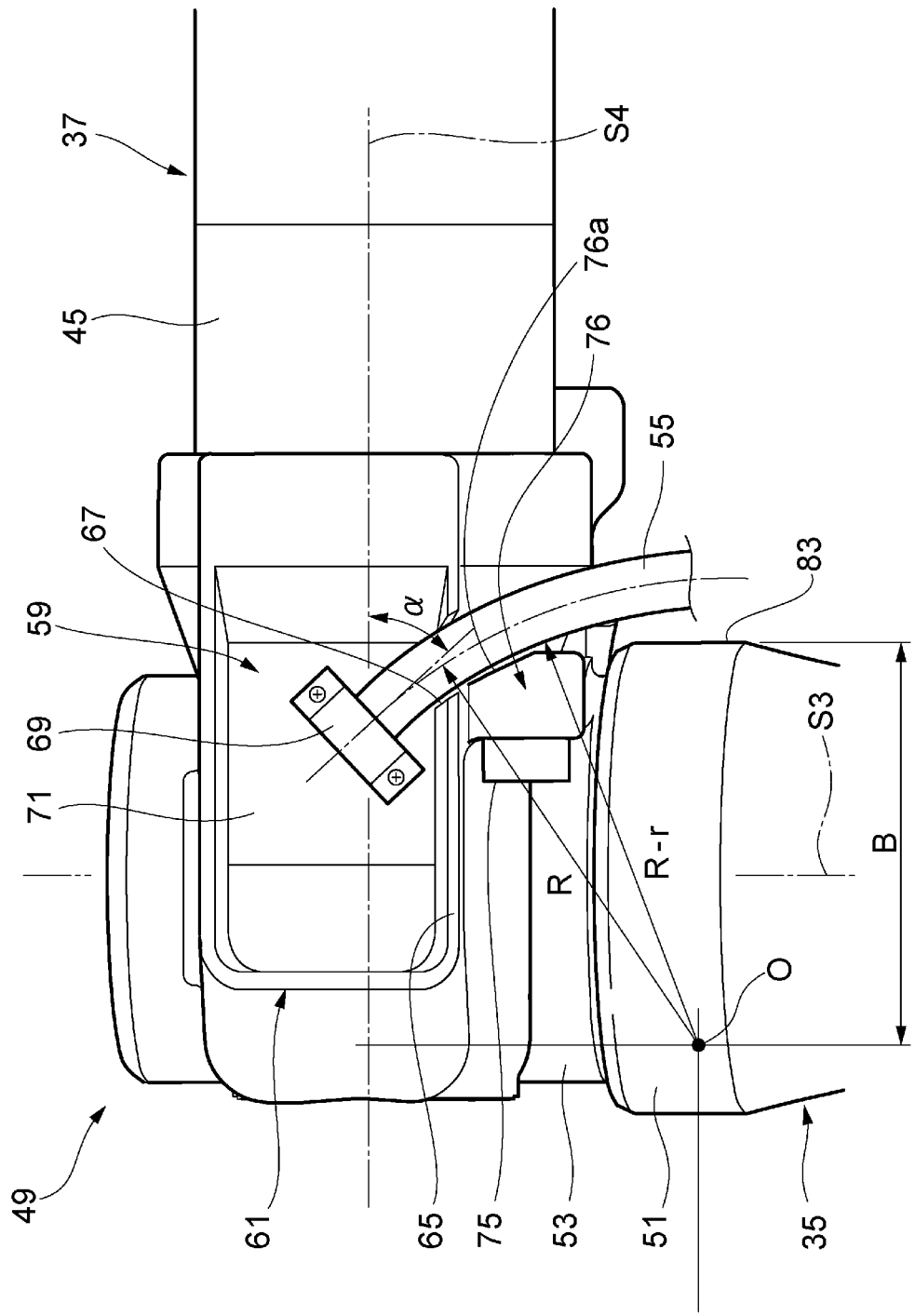
FIG. 5 is an upper view of the arm joint portion of FIG. 4.

FIG. 4 is an enlarged perspective view of an arm joint portion 49 coupled to the lower arm 35 and the upper arm 37, and FIG. 5 is an upper view of the arm joint portion 49 of FIG. 4.

The arm joint portion 49 of a base end portion 53 of the upper arm 37 is supported on a shaft body (not shown) as the third drive shaft S3 fixed to a tip end portion 51 of the lower arm 35. The arm joint portion 49 is configured as a single block body including a S3 motor (not shown) configured to drive the upper arm 37 about the third drive shaft S3 and a S4 motor configured to drive a tip end side of the upper arm 37 about the fourth drive shaft S4. That is, the upper arm 37 has the base-end-side arm joint portion 49 and a rotation shaft portion 45 supported rotatably about the fourth drive shaft S4 on the arm joint portion 49 and having a tip end portion attached to the wrist pivoting portion 39.

A harness 55 is provided on an arm outer side from the tip end portion 51 of the lower arm 35 to the arm joint portion 49 of the upper arm 37. The harness 55 is led out from an arm inner side to the arm outer side at the tip end portion 51 of the lower arm 35, and is led in the arm inner side from the arm outer side at the base-end-side arm joint portion 49 of the upper arm 37. The harness 55 has an outer surface portion formed by a protective tube, and various conductive lines such as signal lines and power lines for the S3 motor and the S4 motor are inserted into the protective tube. Note that the harness 55 may be arranged outside the lower arm 35, and in any case, is provided to extend from the tip end portion 51 of the lower arm 35 to the upper arm 37.

In an axial direction of the third drive shaft S3 at the tip end portion 51 of the lower arm 35, one side of the harness 55 in a longitudinal direction thereof is arranged along an outer surface 47 on a side opposite to an arrangement side of the arm joint portion 49, and is held by a harness holding portion 57 provided at the tip end portion 51 of the lower arm 35. The harness holding portion 57 may be an opening provided at a housing of the lower arm 35 as in an illustrated example, or may be a support member, such as a tying band, provided on the outer surface 47 of the lower arm 35. The harness holding portion 57 holds the harness 55 at the tip end portion 51 of the lower arm 35 so that the harness 55 can be reeled out or can contract and retreat in a longitudinal direction of the lower arm 35.

The other side of the harness 55 in the longitudinal direction thereof is fixed to a harness fixing portion 59 formed at the arm joint portion 49. The harness fixing portion 59 has an annular wall portion 61 protruding outward in a radial direction of the third drive shaft S3, and a lid portion 63 covering a top surface of the annular wall portion 61. At an opposing wall portion 65 of the annular wall portion 61 on a lower arm 35 side in the axial direction of the third drive shaft S3, an opening 67 through which the harness 55 is led in the harness fixing portion 59 from the arm outer side is formed. In the harness fixing portion 59, a tip end of the harness 55 led in through the opening 67 is fixed to an attachment surface 71 with a fixing tool 69. Note that the lid portion 63 is fixed to the annular wall portion 61 with a not-shown fastening member such as a screw.

As illustrated in FIG. 5, the harness 55 is inserted into the arm joint portion 49 from a tip end portion of the upper arm 37 to a base end portion 53 side with the harness 55 being inclined at an inclination angle α from a longitudinal axis (the fourth drive shaft S4) of the upper arm 37. The tip end of the inserted harness 55 is fixed to the attachment surface 71 of the harness fixing portion 59 in a posture inclined from the longitudinal axis. In other words, the harness 55 is inserted through the opening 67 of the arm joint portion 49, and is arranged with the harness 55 being inclined at the inclination angle α from the longitudinal axis of the upper arm 37 toward a tip end portion 51 side of the lower arm 35.

Figure 6:
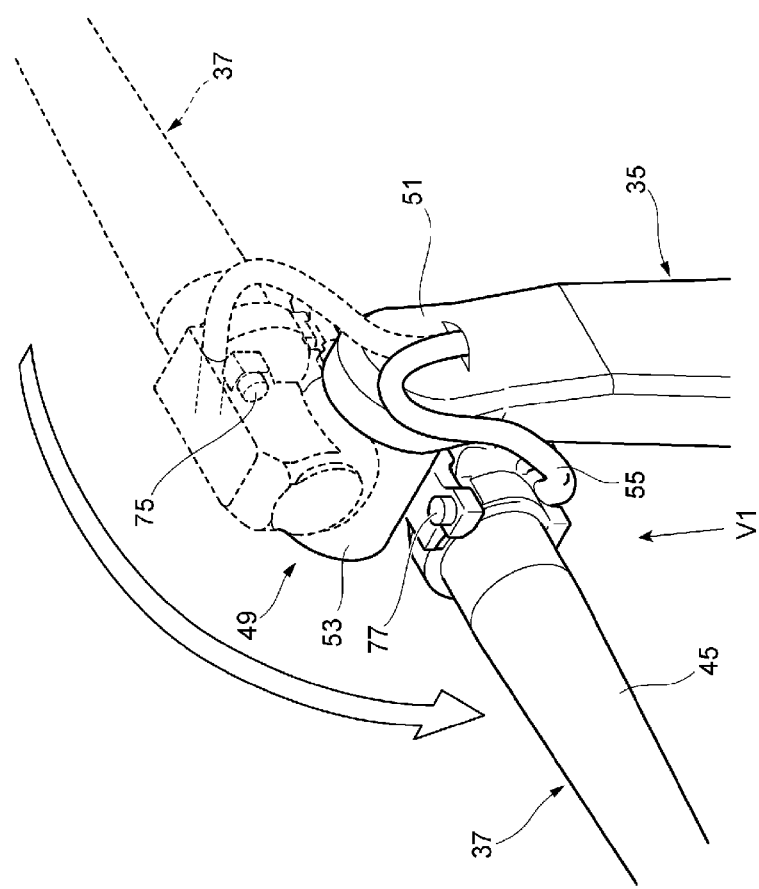
FIG. 6 is a perspective view in a state in which the upper arm is driven in a negative rotation direction from an original posture of the welding robot.
Figure 7:
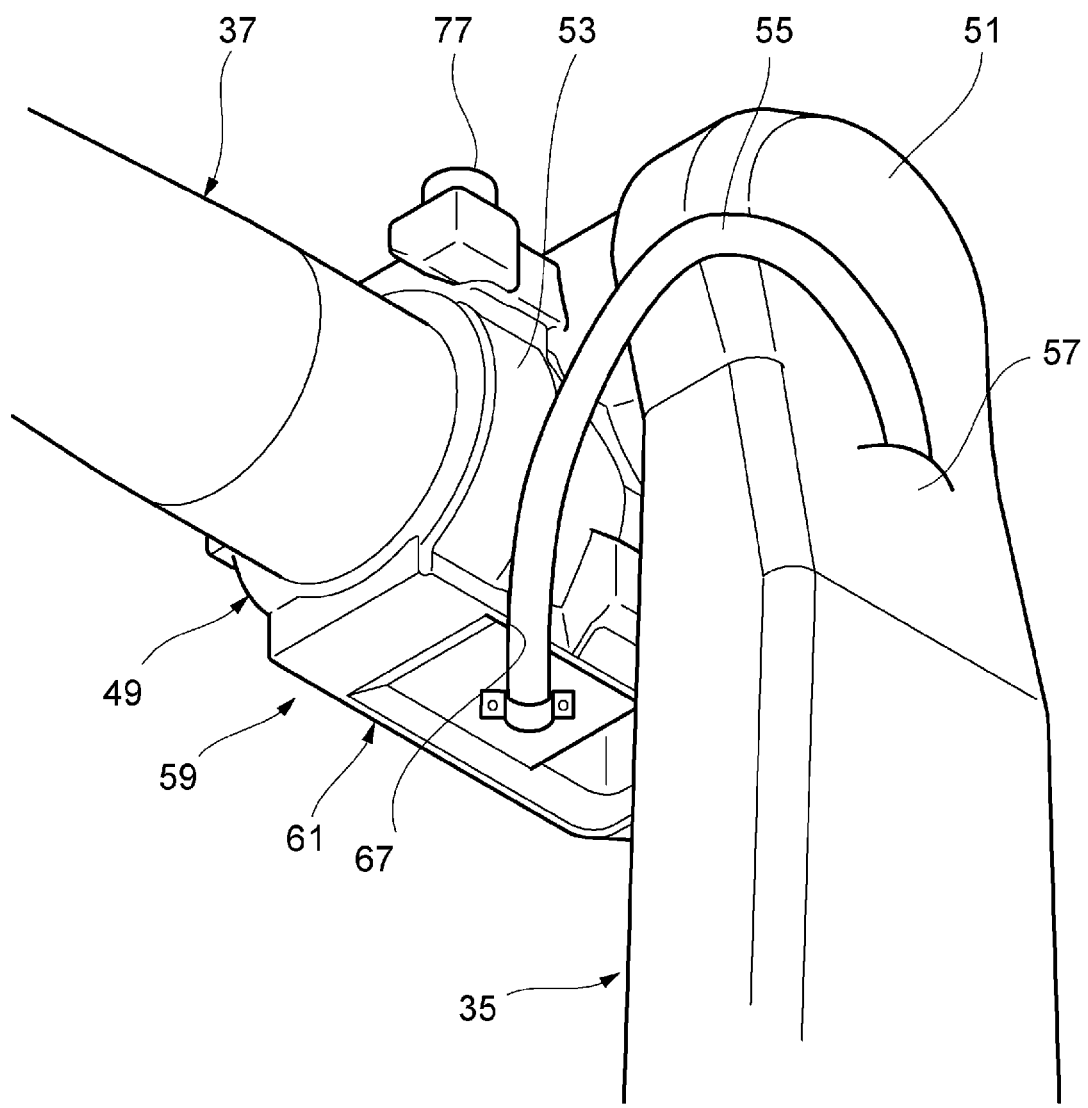
FIG. 7 is a perspective view of the lower arm and the upper arm from a V1 direction of FIG. 6.

FIG. 6 is a perspective view in a state in which the upper arm 37 is driven in a negative rotation direction from an original posture (indicated by a dashed line in the figure) of the welding robot 11, and FIG. 7 is a perspective view of the lower arm 35 and the upper arm 37 from a V1 direction of FIG. 6.

According to the arm joint portion 49 and the harness 55 having the above-described harness connection structure, the harness 55 extends backward in the negative rotation direction of the upper arm 37 from the arm joint portion 49. Thus, even when the upper arm 37 is driven to an inverted position of about −180° from the original posture in the negative rotation direction, the harness 55 does not locally curve with a small curvature radius, but extends to the harness fixing portion 59 of the arm joint portion 49 with the harness 55 smoothly curving from the tip end portion 51 of the lower arm 35.

In a typical harness connection structure, the harness 55 is perpendicularly led in the opposing wall portion 65 (see FIG. 5) of the harness fixing portion 59. Thus, in the case of driving the upper arm 37 in the negative rotation direction, Z-shaped torsion of the harness 55 occurs, and the harness 55 locally curves with a small curvature radius. However, according to the harness connection structure of the present configuration, the harness 55 in a region from the lower arm 35 to the arm joint portion 49 is arranged along a rotation movement direction, and as illustrated in FIG. 7, torsion of the harness 55 such as deformation in a Z-shape is reduced. Moreover, even when the upper arm 37 is driven in a positive rotation direction, local small curvature of the harness 55 does not occur.

As illustrated in FIG. 2, in the welding robot 11 of the present configuration, the lower arm 35 and the upper arm 37 have a first stopper portion 73, a second stopper portion 75, and a third stopper portion 77 (see FIG. 4) for determining a movable area with respect to the lower arm 35 of the upper arm 37. The first stopper portion 73 is provided at the lower arm 35. The second stopper portion 75 is provided at the arm joint portion 49, and is configured to contact the first stopper portion 73 on a leading side in the negative rotation direction of the upper arm 37 about the third drive shaft S3. Moreover, the third stopper portion 77 is provided at the arm joint portion 49, and is configured to contact a back side of the first stopper portion 73 on a leading side of the positive rotation direction of the upper arm 37.

As illustrated in FIGS. 4 and 5, the second stopper portion 75 is arranged on the leading side in the negative rotation direction with respect to the opening 67 through which the harness 55 is led in the harness fixing portion 59. Thus, the harness 55 is arranged on a back side in the negative rotation direction with respect to the second stopper portion 75. In addition, the harness 55 extends from the harness fixing portion 59 to the tip end side of the upper arm 37, and therefore, is not sandwiched between the first stopper portion 73 and the second stopper portion 75.

Next, the above-described harness connection structure will be described in more detail.

Figure 8:
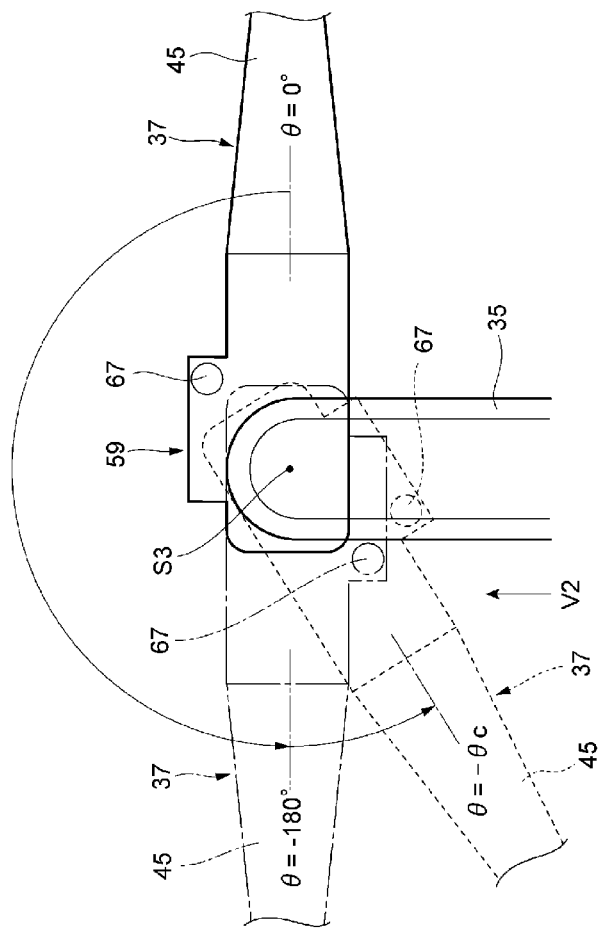
FIG. 8 is a view for describing a positional relationship of an opening of a harness fixing portion between the upper arm and the lower arm at each rotation position.

FIG. 8 is a view for describing a positional relationship of the opening 67 of the harness fixing portion 59 between the upper arm 37 and the lower arm 35 at each rotation position.

In a case where the upper arm 37 is driven about the third drive shaft S3 in the negative rotation direction from the original posture ($\theta=0°$) and is arranged at the inverted position ($\theta=-180°$), the opening 67 of the harness fixing portion 59 does not overlap with the lower arm 35. However, in a case where the upper arm 37 is further driven in the negative rotation direction and reaches such a position ($\theta=\theta c$) that the opening 67 overlaps with the lower arm 35, the harness needs not to be sandwiched between the upper arm 37 and the lower arm 35.

Figure 9:
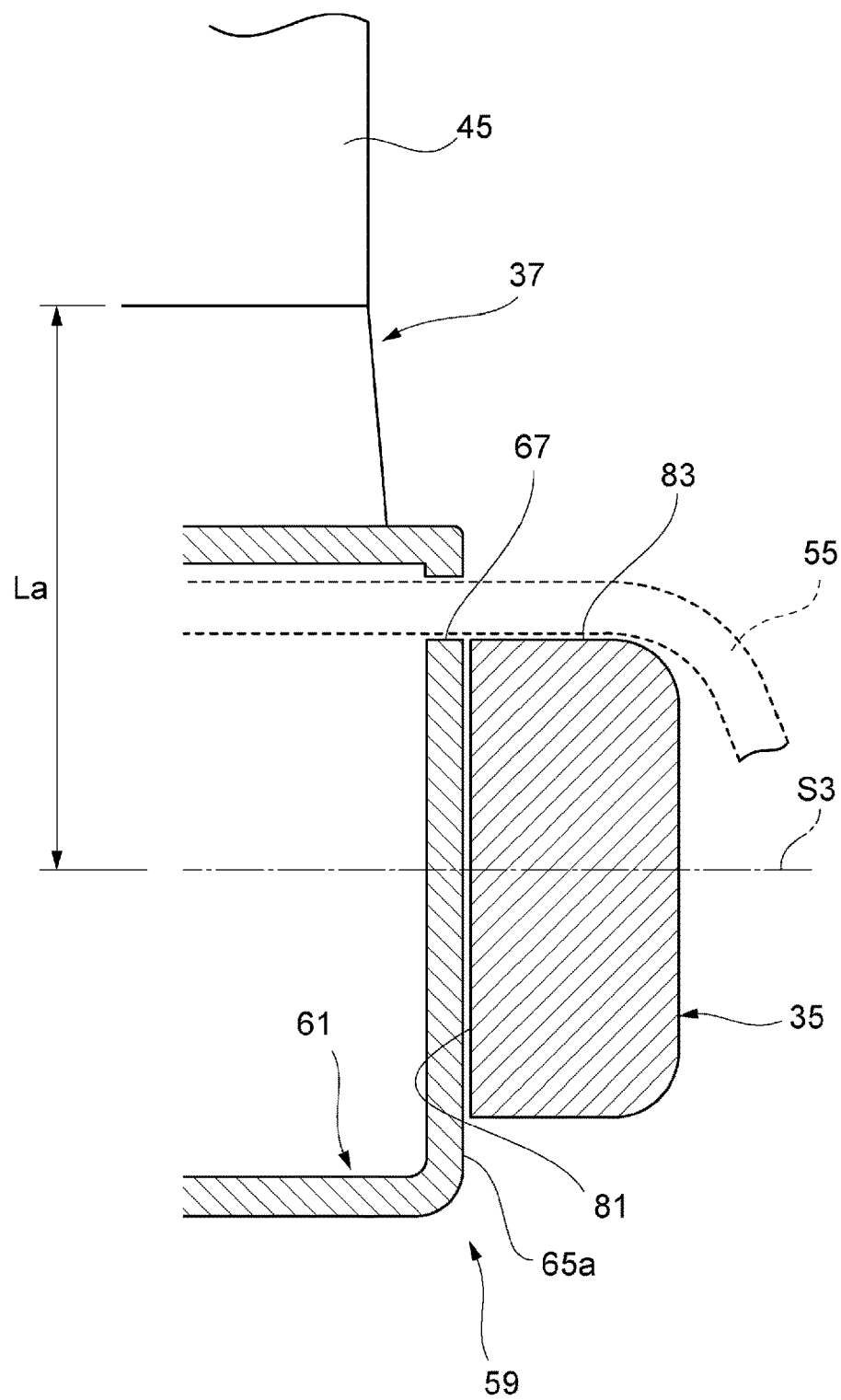
FIG. 9 is a schematic lower view of the lower arm and the upper arm from a V2 direction of FIG. 8 as a reference example.

FIG. 9 is a schematic lower view of the lower arm 35 and the upper arm 37 from a V2 direction of FIG. 8 as a reference example.

A case where the harness 55 is led in the harness fixing portion 59 substantially in parallel with the third drive shaft S3 with almost no clearance being formed between an opposing wall portion 65a of the harness fixing portion 59 formed at the upper arm 37 and an inner surface 81 of the lower arm 35 facing the arm joint portion 49 is assumed herein. In this case, by rotation drive about the third drive shaft S3 of the upper arm 37, an opening region of the opening 67 is going to enter an inner region with respect to a side portion 83 of the lower arm 35 in a width direction (an upper-to-lower direction in the figure) perpendicular to the longitudinal direction of the lower arm 35, i.e., within the width of the lower arm 35 in the upper-to-lower direction in the figure. Then, the harness 55 led in the opening 67 is sandwiched by the side portion 83 of the lower arm 35, and shear force is on the harness 55.

Figure 10:
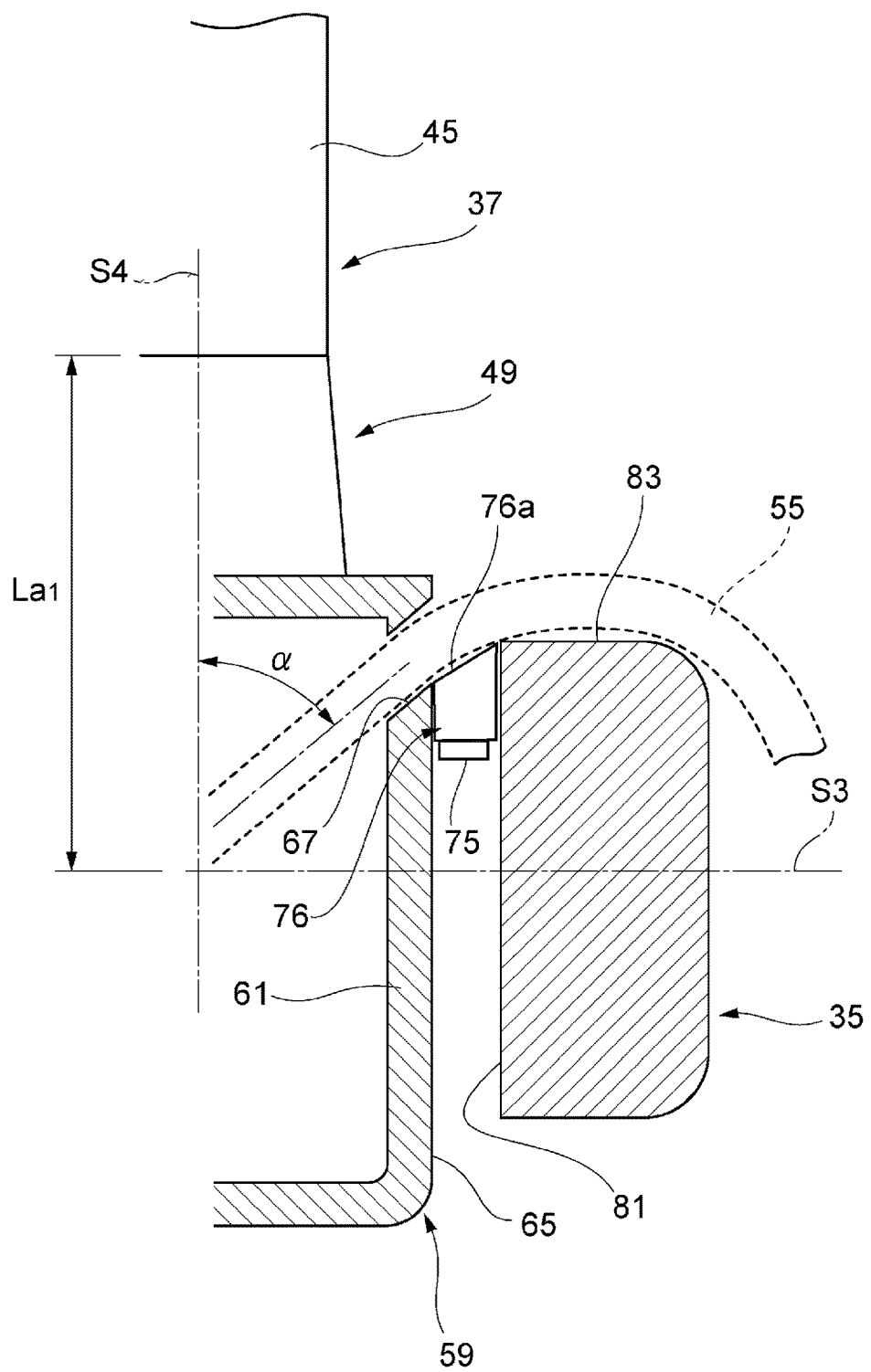
FIG. 10 is a schematic lower view of the lower arm and the upper arm from a V2 direction of FIG. 8 in a harness connection structure of the present configuration.

FIG. 10 is a schematic lower view of the lower arm 35 and the upper arm 37 from the V2 direction of FIG. 8 in the harness connection structure of the present configuration.

A case where an inclined surface 76a configured to guide the harness 55 is provided on a side opposite to an arrangement side of the second stopper portion 75 at a support portion 76 of the second stopper portion 75 arranged between the opposing wall portion 65 of the harness fixing portion 59 and the inner surface 81 of the lower arm 35 and the harness 55 protrudes from the opening 67 in an inclined state is assumed herein.

In this case, in the original posture of the upper arm 37, the opening 67 is formed with an inclined surface inclined at the inclination angle $\alpha$ from the fourth drive shaft S4, and is connected to the inclined surface 76a of the support portion 76 with the same inclination as that of the inclined surface 76a. Thus, the harness 55 is arranged with the harness 55 gently curving from the opening 67 to the side portion 83 of the lower arm 35. Thus, no great shear force acts on the harness 55 by rotation drive about the third drive shaft S3 of the upper arm 37.

As illustrated in FIG. 5, the harness 55 protruding from the opening 67 to the lower arm 35 is, by the inclined surface of the opening 67 and the inclined surface 76a of the support portion 76, arranged in a state in which the harness 55 is inclined from the fourth drive shaft S4 and gently curves. When the curvature radius of the harness 55 is R, the center of curvature is O, and the diameter of the harness 55 is 2r, the minimum curvature radius Rt of the harness 55 at a curved inner surface thereof is represented by Rt=R−r.

The curvature radius R of the harness 55 is preferably equal to or greater than the allowable bending radius of the harness 55. In this case, even in any posture of the upper arm 37, damage due to bending of the harness 55 can be prevented. Moreover, even in a case where the harness 55 reaches the allowable bending radius, the tip end portion 51 of the lower arm 35 is preferably arranged inside an arc line with the above-described minimum curvature radius Rt in the radial direction. That is, a distance B from the curvature radius center O of the harness 55 to the side portion 83 of the lower arm 35 is preferably smaller than the minimum curvature radius Rt in a case where the allowable bending radius is R. According to this configuration, even if the harness 55 curves to the allowable bending radius, contact between the harness 55 and the tip end portion 51 of the lower arm 35 is avoided.

As described above, according to the harness connection structure of the present configuration, the opening 67 is, as illustrated in FIG. 10, arranged inside the side portion 83 of the lower arm 35 in the width direction of the lower arm 35 in the original posture of the upper arm 37. Thus, the length (in an illustrated example, indicated by a distance La1 from the third drive shaft S3 to a boundary between the rotation shaft portion 45 of the upper arm 37 and the arm joint portion 49) of the arm joint portion 49 in a fourth drive shaft S4 direction can be shortened as compared to a distance La in the case of the reference example illustrated in FIG. 9.

Thus, according to the harness connection structure illustrated in FIG. 10, the length of the arm joint portion 49 in the fourth drive shaft S4 direction is shortened, and reduction in the size of the arm joint portion 49 and reduction in the weight of the arm joint portion 49 can be realized. Thus, occurrence of vibration due to arm inertia in arm drive can be reduced. Thus, according to the welding robot having this harness connection structure, high-quality welding as intended can be realized, and the quality of a resultant welded product can be improved.

Particularly, in a case where weaving operation of the welding torch 21 is performed using the two-axis weaver, unnecessary vibration of the welding torch 21 due to, e.g., arm inertia in motor drive can be reduced, and higher-accuracy swing operation can be realized.

Moreover, regardless of a rotation state of the arm joint portion 49, contact between the harness 55 and the tip end portion 51 of the lower arm 35 can be avoided, and damage of the harness 55 can be prevented in advance.

If there is room for an inter-shaft distance from the third drive shaft S3 to the fourth drive shaft S4, when the harness 55 is led in the upper arm 37 from a base end side (the lower arm 35 side) of the upper arm 37, an operation area of the upper arm 37 in both of front and back directions can be expanded. However, in this case, the upper-to-lower height of the arm joint portion 49 connecting the third drive shaft S3 and the fourth drive shaft S4 is increased. This leads to lower robot rigidity, and it is difficult to ensure proper welding torch movement accuracy. Further, the length of an exposed portion of the harness 55 from the lower arm 35 and the upper arm 37 is increased. Thus, contact with peripheral members easily occurs, and the probability of damaging the harness 55 during robot operation is increased. The harness may be drawn in through a hollow portion by means of a reducer with a hollow structure as the third drive shaft S3, but in this case, a cost is higher.

On the other hand, according to the robot-arm harness connection structure of the present configuration, damage of the harness 55 can be prevented without lowering robot rigidity, and high-accuracy drive can be realized with low cost.

The present invention is not limited to the above-described embodiment. The present invention also includes combinations of the configurations of the embodiment and changes and applications made based on description of the specification and well-known techniques by those skilled in the art, and these combinations, changes, and applications are included in the scope of protection sought.

Application to the welding robot has been described as the above-described robot-arm harness connection structure by way of example, but the present configuration is not limited to above. The present configuration is also applicable to robot arms of industrial robots for performing various types of operation such as member cutting, assembly, transfer, and delivery.

A wire member, such as the conductive line, inserted into the harness is not limited to a motor drive purpose, and other members such as a pipe for supplying shield gas or cooling water to the welding torch and a power cable for supplying welding power for arc generation may be mixed or arranged alone.

The present application is based on a Japanese patent application (Japanese Patent Application No. 2017-17110) filed Feb. 1, 2017, the disclosure of which is incorporated herein by reference.

EXPLANATION OF REFERENCE NUMERALS 11 welding robot (multi-joined welding robot)
19 end effector
21 welding torch
31 base
33 pivoting portion
35 lower arm (first arm)
37 upper arm (second arm)
49 arm joint portion
51 tip end portion
53 base end portion
55 harness
57 harness holding portion
59 harness fixing portion
67 opening
73 first stopper portion
75 second stopper portion
81 inner surface

The invention claimed is:

1. A robot-arm harness connection structure comprising:
a first arm having a tip end portion;
a second arm extending in a longitudinal axis thereof, the second arm having a base end at one end thereof along the longitudinal axis, the base end being rotatably coupled to the tip end portion of the first arm through a rotation axis of an arm joint portion; and
a harness extending out from the tip end portion of the first arm and led into the second arm at the arm joint portion of the second arm,
wherein the tip end portion of the first arm has a harness holding portion for holding one longitudinal end of the harness,
the arm joint portion has a harness fixing tool for fixing the other longitudinal end of the harness to an inside of the arm joint portion, and
the harness fixing tool fixes the other longitudinal end of the harness such that a portion of the harness that is adjacent to the other longitudinal end that is fixed by the harness fixing tool is inclined, in a plane parallel to the rotation axis and the longitudinal axis of the second arm, by an acute angle from the longitudinal axis of the second arm and in a direction toward the tip end portion of the first arm.

2. The robot-arm harness connection structure according to claim 1, wherein
the harness fixing tool generates a curvature about a center of curvature, for the portion of the harness that is adjacent to the fixed other longitudinal end of the harness;
the harness is configured such that a bending radius of the curvature generated by the harness fixing tool is equal to or greater than an allowable bending radius of the harness, and
the tip end portion of the first arm is arranged at the same side of the harness as is the center of curvature.

3. The robot-arm harness connection structure according to claim 1, wherein
the first arm has a first stopper portion,
the second arm has a second stopper portion configured to contact the first stopper portion due to rotation of the second arm in a rotation direction, and an opening through which the harness extending from the tip end portion of the first arm is led into the second arm at the arm joint portion, and
the second stopper portion leads the opening in a direction reverse to the rotation direction.

4. The robot-arm harness connection structure according to claim 1, wherein
a conductive line connected to a motor configured to rotatably drive the second arm is provided in the harness.

5. The robot-arm harness connection structure according to claim 3, wherein
a conductive line connected to a motor configured to rotatably drive the second arm is provided in the harness.

6. A multi-joined welding robot comprising:
the robot-arm harness connection structure according to claim 1.

7. The multi-joined welding robot according to claim 6, further comprising:
a pivoting portion provided pivotably about a first drive shaft along a vertical direction on a base;
the first arm having a base end portion coupled to the pivoting portion through a second drive shaft along a horizontal direction; and
the second arm coupled to the tip end portion of the first arm and provided rotatably about a third drive shaft parallel with the second drive shaft, wherein the third drive shaft comprises said rotation axis.

8. The robot-arm harness connection structure according to claim 2, wherein
the first arm has a first stopper portion,
the second arm has a second stopper portion configured to contact the first stopper portion due to rotation of the second arm in a rotation direction, and an opening through which the harness extending from the tip end portion of the first arm is led into the second arm at the arm joint portion, and
the second stopper portion leads the opening in a direction reverse to the rotation direction.

9. The robot-arm harness connection structure according to claim 2, wherein
a conductive line connected to a motor configured to rotatably drive the second arm is provided in the harness.

10. A multi-joined welding robot comprising:
the robot-arm harness connection structure according to claim 2.

* * * * *